S. Adams,
Coal Screen.

Nº 18,125.   Patented Sep. 8, 1857.

UNITED STATES PATENT OFFICE.

SANFORD ADAMS, OF BOSTON, MASSACHUSETTS.

COAL-SIFTER.

Specification of Letters Patent No. 18,125, dated September 8, 1857.

*To all whom it may concern:*

Be it known that I, SANFORD ADAMS, of Boston, in the county of Suffolk and State of Massachusetts, have invented an Improved Sifter, for Sifting Coals, Seeds, Drugs, &c.; and I hereby declare that the nature and operation of the same is fully described in the following specification, reference being had to the accompanying drawings, to which the specification and letters refer.

My invention consists in the manner of supporting the sieve so as to be rotated or partly rotated within the box or barrel to which it is applied.

Figure 1:
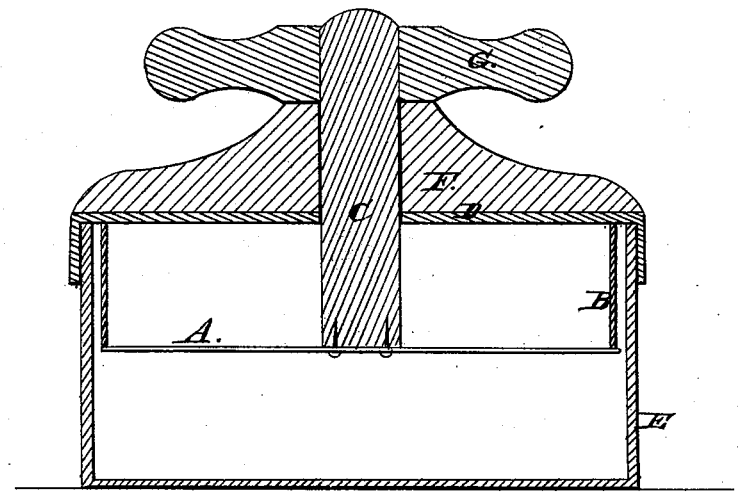
Figure 2:
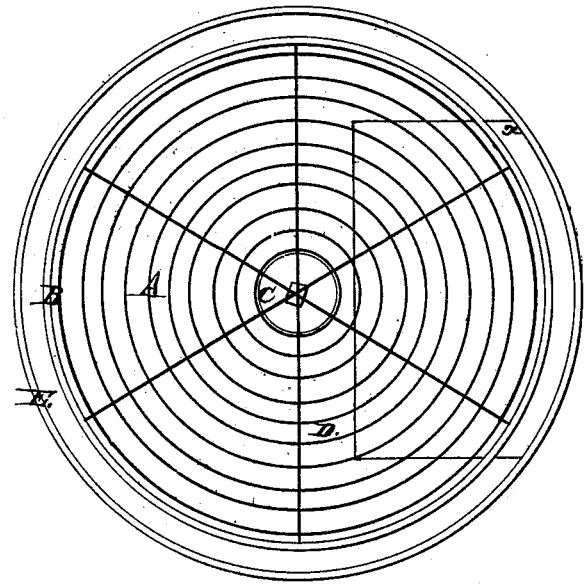

Of the accompanying drawings, Figure 1 represents a vertical central section of the sifter, Fig. 2, a bottom view of the sieve.

A in the drawings denotes a sieve constructed of a helix of wire, or in any suitable manner, and extending across the bottom of a cylinder B. The sieve is fastened upon the bottom of a rotating spindle C, which extends up from the sieve, through the cover D, of the box or barrel E, and through a bearing block F, placed upon said cover.

The cylinder B, is made smaller in diameter than is the box or barrel E, so that it shall extend down into the barrel, and leave a space between the cylinder and the barrel. The cover is made to fit tightly upon the barrel, so that when reciprocating rotary motion may be applied to the spindle (by means of a hand bar, G, or any suitable contrivance) such motion shall be communicated to the cylinder and its sieve, without giving any motion to the cover.

The top of the cylinder B, comes almost up into contact with the bottom surface of the cover, but not so as to touch it at any point, and the only bearing of the sieve or cylinder, is at the spindle bearing, through the cover.

Coal ashes, (or other substances) being introduced into the cylinder, through the cover opening, and a reciprocating rotary motion given to the sieve, the ashes fall quickly through the meshes and the sifter is very easily operated, by only having a bearing and support in the cover of its barrel.

The sieve, thus constructed, is easily applied to a barrel, and removed therefrom, or it can be applied to a cylindrical coal hod, to serve as a parlor coal sifter, as the sifting is all done in a close box or ash receptacle. So also in sifting seeds or drugs the sieve is easily used indoors as the dust is entirely prevented from flying as will be readily understood.

These sieves can be very cheaply made, and in sifting ashes into barrels, they are a very great convenience, as they are portable, easily operated, and applied, and as not liable to the objections that appertain to most other sifters, that of causing the ashes and dust to rise and cover the operator.

What I claim is—

Attaching the sieve to the bottom of the rotating spindle and the spindle to the cover of a barrel in the manner and for the purpose as above specified.

In testimony whereof I have hereto set my signature this fourth day of August A. D. 1857.

SANFORD ADAMS.

Witnesses:
FRANCIS GOULD,
NATHAN A. DYAR.